US009702432B2

(12) United States Patent
Manzoor (10) Patent No.: US 9,702,432 B2
(45) Date of Patent: Jul. 11, 2017

(54) DAMPER ISOLATOR WITH MAGNETIC SPRING

(71) Applicant: Suhale Manzoor, Plymouth, MI (US)

(72) Inventor: Suhale Manzoor, Plymouth, MI (US)

(73) Assignee: DAYCO IP HOLDINGS, LLC, Troy, MI (US)

(*) Notice: Subject to any disclaimer, the term of this patent is extended or adjusted under 35 U.S.C. 154(b) by 0 days.

(21) Appl. No.: 14/966,505

(22) Filed: Dec. 11, 2015

(65) Prior Publication Data

US 2016/0195162 A1    Jul. 7, 2016

Related U.S. Application Data

(60) Provisional application No. 62/091,219, filed on Dec. 12, 2014.

(51) Int. Cl.
| | | |
|---|---|---|
| F16F 15/18 | (2006.01) | |
| F16F 15/12 | (2006.01) | |
| F16H 55/36 | (2006.01) | |
| F16F 6/00 | (2006.01) | |

(52) U.S. Cl.
CPC .............. F16F 15/18 (2013.01); F16F 6/00 (2013.01); F16F 15/12 (2013.01); F16H 55/36 (2013.01); F16H 2055/366 (2013.01)

(58) Field of Classification Search
CPC ..... F16H 55/36; F16H 2055/366; F16F 15/12
See application file for complete search history.

(56) References Cited

U.S. PATENT DOCUMENTS

| | | | | |
|---|---|---|---|---|
| 6,044,943 A | * | 4/2000 | Bytzek | F16D 41/20 192/212 |
| 7,658,127 B2 | * | 2/2010 | Crist | F16F 15/126 74/572.2 |
| 9,391,489 B2 | * | 7/2016 | Atkins | F16F 15/18 |

(Continued)

FOREIGN PATENT DOCUMENTS

| | | |
|---|---|---|
| DE | 101 14 079 | 10/2002 |
| DE | 10 2007 014 307 | 10/2007 |

(Continued)

OTHER PUBLICATIONS

PCT, International Search Report and Written Opinion, PCT/US2015/065242, (Feb. 23, 2016).

(Continued)

*Primary Examiner* — William E Dondero
*Assistant Examiner* — Mark K Buse
(74) *Attorney, Agent, or Firm* — Thompson Hine LLP (57) ABSTRACT

Damper-isolators are disclosed that have a hub defining a bore for receiving a shaft, a pulley body mated to the hub to collectively define a magnet track that is concentric about the bore, a damper assembly operatively disposed between the hub and a belt engaging portion of the pulley body, a first magnet positioned within the magnet track and connected to the hub for rotation therewith, and a second magnet positioned within the magnet track and connected to the pulley body for rotation therewith. The first magnet and the second magnet are positioned with like polarities facing one another. A front end accessory drive system having one of the damper-isolators is also disclosed.

18 Claims, 4 Drawing Sheets

(56) References Cited

U.S. PATENT DOCUMENTS

| | | | | |
|---|---|---|---|---|
| 2004/0231629 A1* | 11/2004 | Linnig | ................ | F16F 15/1207 |
| | | | | 123/192.1 |
| 2008/0176662 A1* | 7/2008 | Tateno | .................... | F16D 1/033 |
| | | | | 464/160 |
| 2009/0105021 A1* | 4/2009 | Amati | ................. | H02K 7/1012 |
| | | | | 474/94 |
| 2010/0127440 A1* | 5/2010 | Chang | .................... | F16F 3/093 |
| | | | | 267/140.12 |
| 2010/0259121 A1* | 10/2010 | Ueda | ....................... | F16D 27/01 |
| | | | | 310/103 |
| 2011/0056787 A1* | 3/2011 | Luo | ........................ | F16F 15/18 |
| | | | | 188/380 |

FOREIGN PATENT DOCUMENTS

| | | |
|---|---|---|
| DE | 10 2008 028 471 | 12/2009 |
| JP | 2012/002253 | 1/2012 |
| JP | 2012-013115 | 1/2012 |
| JP | 2012-104614 | 5/2012 |

OTHER PUBLICATIONS

Dayco, Commercially available torsion vibration damper isolators (available at least as early as Apr. 11, 2013).

* cited by examiner

DAMPER ISOLATOR WITH MAGNETIC SPRING

FIELD OF THE DISCLOSURE

The present invention relates to torsional vibration dampers for vehicle engines and, more particularly, to torsional vibration dampers, decouplers, or pulleys having a magnetic isolator spring.

BACKGROUND

Originally, a crankshaft drove the front end assembly drive (FEAD) system of an engine. The crankshaft was turned by the firing of pistons, which exerted a rhythmic torque on the crankshaft, rather than being continuous. This constant application and release of torque caused vacillations, which would stress the crankshaft to the point of failure. Stated another way the crankshaft is like a plain torsion-bar, which has a mass and a torsional spring rate, that causes the crankshaft to have its own torsional resonant frequency. The torque peaks and valleys plus the inertia load from the acceleration of the reciprocating components causes the crankshaft itself to deflect (rotationally) forward and backward while it is operating. When those pulses are near the crankshaft resonant frequency, the crankshaft vibrates uncontrollably and will eventually break. Accordingly, a torsional vibration damper (sometimes referred to as a crankshaft damper) is mounted on the crankshaft to solve this problem by counteracting torque to the crankshaft, thereby negating the torque twisting amplitude placed upon the crankshaft by periodic firing impulses, and to transfer rotational motion into the FEAD system, typically by driving an endless power transmission belt.

While existing torsional vibration dampers have been effective to extend the life of the crankshaft and to drive the FEAD system, changes in vehicle engine operation, such as the introduction of start-stop systems to conserve fuel consumption, add complexities to the system that the existing torsional vibration dampers are not designed to address. For instance, the start-stop system introduces impact forces due to belt starts that introduce potential slip in the elastomer-metal interface in traditional torsion vibration dampers. Another concern is maintaining good axial and radial run-outs between the metallic components.

Some torsional vibration dampers also include an isolator system. Some of these isolator systems use an elastomeric rubber spring, which provides a highly non-linear spring rate. However, these elastomer-based isolator systems tend to fail after prolonged use, and accordingly have a finite fatigue life. Isolators with elastomer springs also have high temperature vs. frequency dependence, which means that the performance of elastomer springs may vary depending upon the temperature. The elastomer spring material tends to be "softer" at lower temperatures than at higher temperatures, which changes the elastomeric attributes of the material. Accordingly, elastomeric springs are typically designed to operate within a nominal temperature range, and, in some cases, may not function properly when used under temperature conditions that vary from the nominal temperature range.

Other isolator systems use mechanical springs, which provide a large free angle for vehicle start/stop. However, these systems tend to produce undesirable audible noise as the metallic spring rubs against its carriage. To alleviate the noise, it is common to pack the spring cavity with grease. These mechanical spring-based isolators tend to be heavy because of the weight of the springs, the seating arrangement, etc. These systems can also be expensive in terms of both material and manufacturing costs (for example, the spring is often nitrided for wear resistance against the spring cavity).

Accordingly, improved designs for torsional vibration dampers having isolators, which may also be referred to as isolators, decouplers, or pulleys, are needed which are relatively quiet in operation, light and compact in construction, and inexpensive, yet which provide a relatively large free angle for vehicle start/stop and non-linear spring functionality.

SUMMARY

The damper-isolators disclosed herein overcome the limitations and problems discussed in the background section above. The damper isolators do so by the inclusion of a plurality of magnets with like polarities facing one another to provide isolator functionality, rather than an elastomeric or mechanical spring. The repulsive forces between the plurality of magnets allow a particular amount or degree of rotation of the hub relative to the pulley or vice versa.

In one aspect, damper-isolators are disclosed. Damper-isolators are disclosed that have a hub defining a bore for receiving a shaft, a pulley body mated to the hub to collectively define a magnet track that is concentric about the bore, a damper assembly operatively disposed between the hub and a belt engaging portion of the pulley body, a first magnet positioned within the magnet track and connected to the hub for rotation therewith, and a second magnet positioned within the magnet track and connected to the pulley body for rotation therewith. The first magnet and the second magnet are positioned with like polarities facing one another.

The damper assembly has an elastomeric damper member radially outward and concentric about the hub, and an inertia member seated against the elastomeric damper member thereby operably coupling the inertia member to the hub for rotation therewith.

The hub has a first pocket in which the first magnet is seated, and the pulley body has a second pocket in which the second magnet is seated. The first pocket may be defined by a pair of first partitions within the magnet track, and the second pocket may be defined by a pair of second partitions within the magnet track. The first magnet and the second magnet are both connected to their respective hub or pulley body by a fastener, which may comprise a ferromagnetic material while the hub and the pulley body are made of non-ferromagnetic material. Additionally, the hub and the pulley body, collectively, define a first clearance gap between the first magnet and the pulley body and a second clearance gap between the second magnet and the hub along the respective line of travel of each within the magnet track.

One or more slide bearings are present in any or all of the damper-isolators to keep debris out of the magnet track. Each slide bearing is disposed between mating radially facing surfaces of the hub and the pulley body that are rotatable relative to one another.

The damper-isolator may include a plurality of first magnets and a plurality of second magnets, which are positioned in an alternating fashion relative to one another within the magnet track and may each be evenly spaced apart from one another within the magnet track.

In another aspect, any one of the damper-isolators is incorporated into a front end accessory drive system of a vehicle, for example on the crankshaft as a torsional vibration damper or on a drive shaft.

Other aspects of the invention will be readily apparent in view of the descriptions and examples presented herein.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
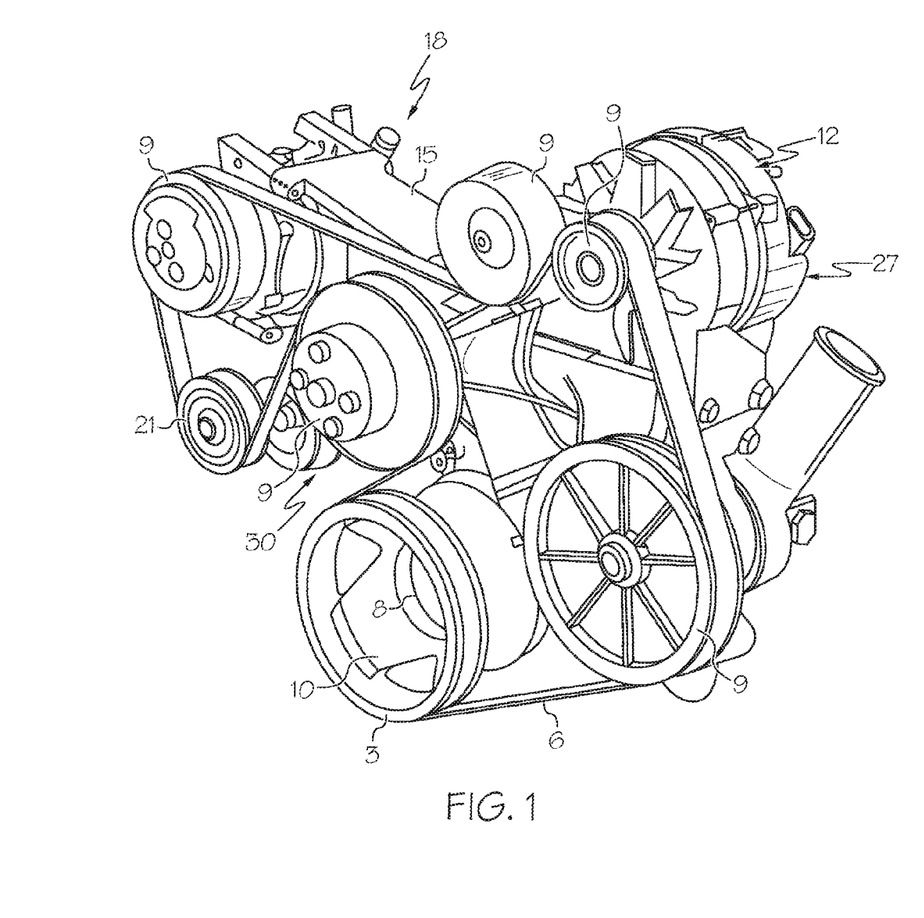
FIG. 1 is a perspective view of components in a front end accessory drive.

Referring now to FIG. 1, an example of one embodiment of a FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depend upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. In FIG. 1, the integrated housing 15 has a plurality of engine drive accessories 9, such as an alternator 12, pulleys, fan, etc., driven by at least one endless drive belt 6, a flat belt, a rounded belt, a V-belt, a multi-groove belt, a ribbed belt, etc., or a combination of the aforementioned belts, being single or double sided, and a belt tensioner 21. The crankshaft drives the torsional vibration damper 3, which is connected to the nose 10 of the crankshaft 8, and thereby drives the endless drive belt 6, which in turn drives the remaining engine drive accessories 9.

Figure 2:
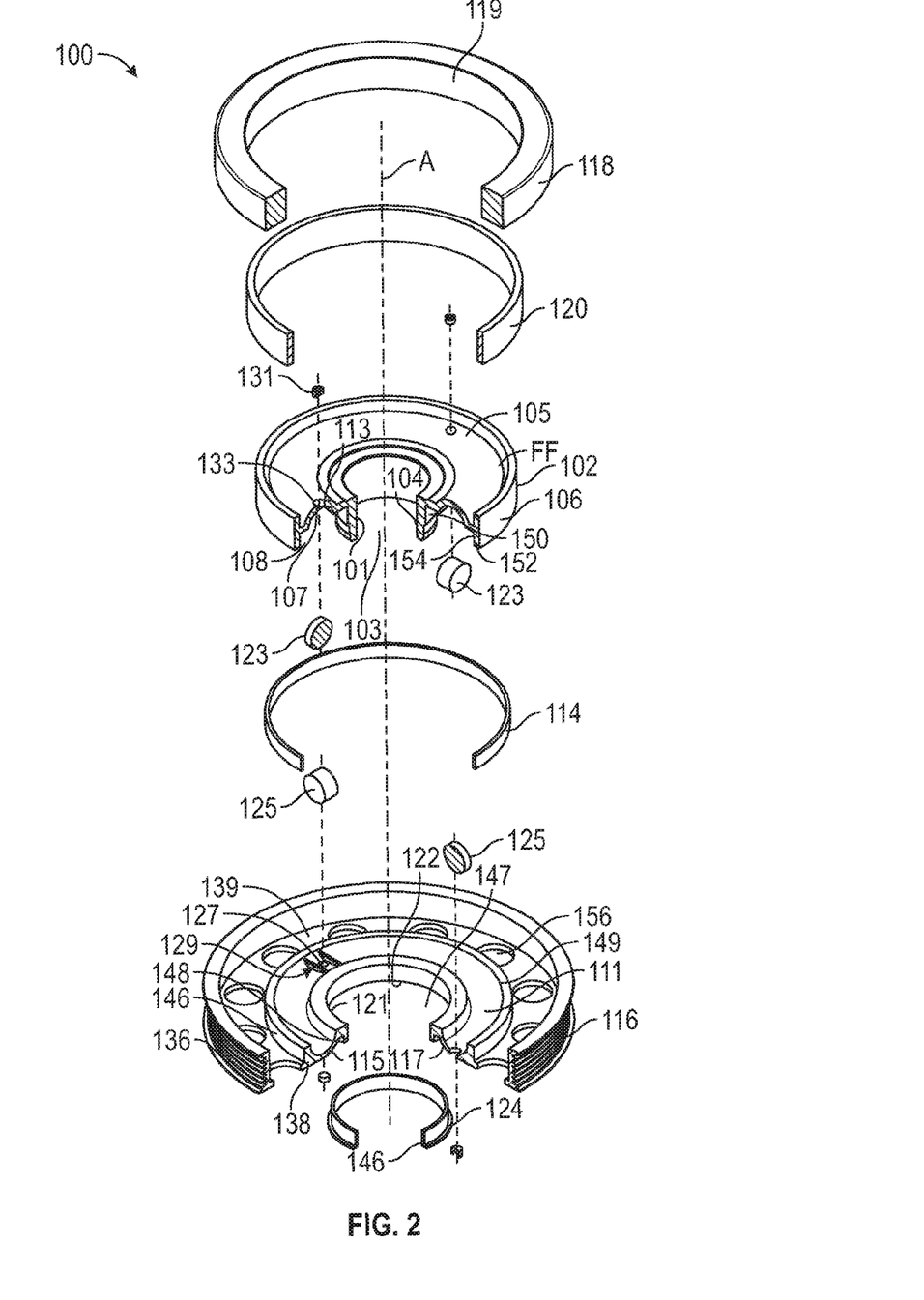
FIG. 2 is an exploded, partial cut-away, perspective view of a torsional vibration damper having a magnetic spring isolator system.
Figure 3:
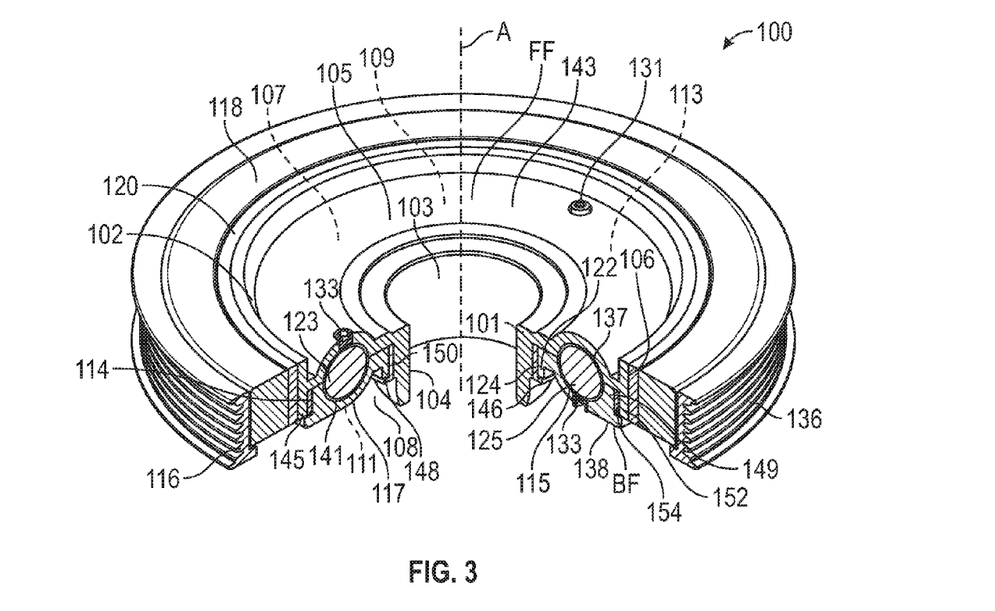
FIG. 3 is an assembled view of the torsional vibration damper of FIG. 2.

The improvement to the FEAD system 18 herein is a damper-isolator, generally designated by reference 100 in FIGS. 2 and 3, that uses magnets as the isolator. Though shown and described in the context of the FEAD system 18, one of ordinary skill will recognize that the damper-isolator 100 is also suitable for any of a variety of analogous contexts in a variety of vehicles or mechanical devices. The damper-isolator 100 as seen in FIG. 2 includes from top to bottom, relative to the orientation of the drawing on the page, an inertia member 118, an elastomeric damper member 120, a hub 102, first and second hub magnets 123, a first slide bearing 114, first and second pulley body magnets 125, a pulley body 116, and a second slide bearing 124. The hub 102 is mountable to a crankshaft, by receiving the crankshaft through its central bore 103.

Figure 5:
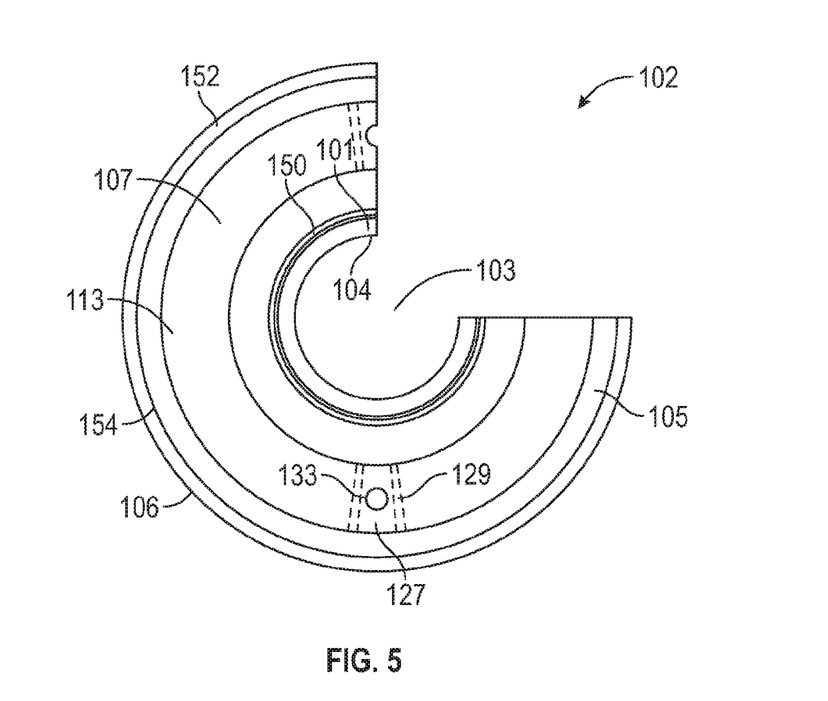
FIG. 5 is a partial bottom view of a hub of the torsional vibration damper of FIG. 2.

Referring to FIGS. 2, 3, and 5, the hub 102 has a flange 101 defining the central bore 103. The flange 101 has an inner radial surface 104 that defines the central bore 103 and an opposing outer radial surface 150. Also, the hub 102 has an outermost radial surface 106 defined by a second flange 152 that is spaced radially outward from the flange 101 by a plate 105 to thereby define an annular receptacle 108 therebetween. The second flange 152 also has an inner radial surface 154. The plate 105 includes a radially arcuate, axially curved portion 113 that defines an arcuate first groove 107 that is radially-concentric about the central bore 103 and the first flange 101. In one embodiment, the groove 107 is generally semicircular in cross section. The curved portion 113 and corresponding groove 107 may form a complete ring, or less than a complete ring. The curved portion 113 may be a contoured face of the plate 105 as shown, or may be formed between contoured ridges (not shown) extending from the plate 105 (whether integral with the plate 105 or attached thereto). As shown in FIG. 3, the flange 101 of the hub 102 defining the central bore 103 may extend axially in only one direction from the plate 105. Here, the plate 105 defines a front face FF of the damper-isolator 100, which will receive the nose seal 10 (FIG. 1) fastening the damper-isolator 100 to a shaft, such as a crankshaft, for rotation therewith.

The hub 102 may be cast, spun, forged, machined, or molded using known or hereinafter developed techniques. Suitable materials for the hub include aluminum, plastics, and other suitable non-ferromagnetic materials, or a combination thereof, including composite materials.

Figure 6:
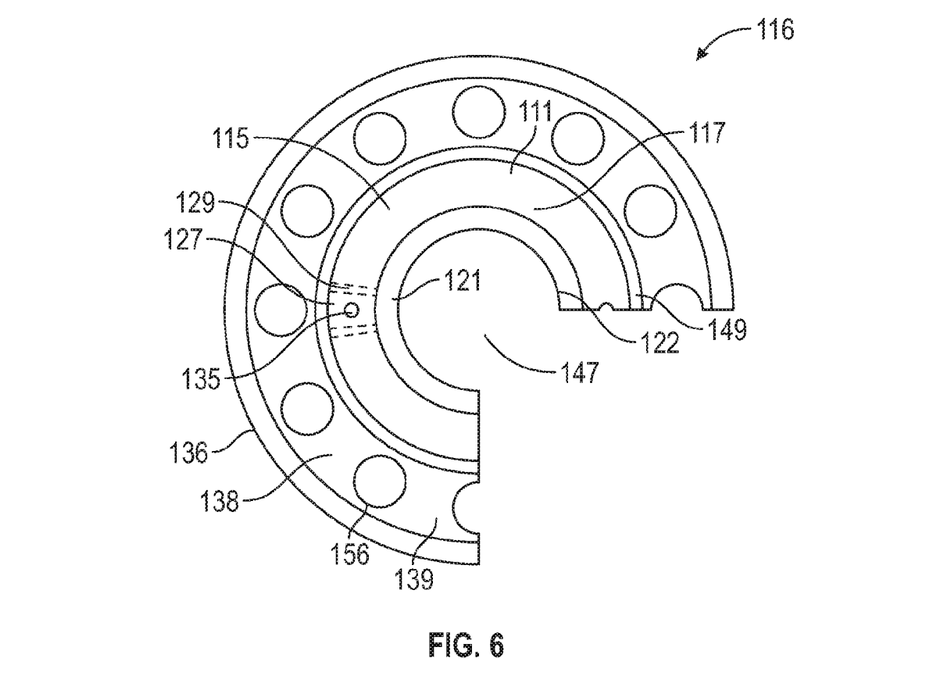
FIG. 6 is a partial top view of a pulley body of the torsional vibration damper of FIG. 2.

Referring now to FIGS. 2, 3, and 6, the pulley body 116 includes a belt engaging portion 136 and a face guard 138 positioned radially inward from the belt engaging surface and connected thereto by a plurality of spokes 139 or a plate that may be solid or include a plurality of voids 156 to reduce material cost and weight. The face guard 138 terminates at its radial innermost in a sleeve 122 that defines a central bore 147 in the pulley body 116. The face guard 138 defines a back face BF of the damper-isolator 100 and includes a radially arcuate, axially curved portion 115 opposite the back face BF. Accordingly, the radially arcuate, axially curved portion 115 faces the hub 102, in particular faces the radially arcuate, axially curved portion 113 of the hub 102. The radially arcuate, axially curved portion 115 defines an arcuate, second groove 111 in the face guard 138 that is radially-concentric about the sleeve 122. In one embodiment, the second groove 111 is generally semicircular in cross-section. The radially arcuate, axially curved portion 115 and corresponding second groove 111 may form a complete ring or less than a complete ring. The radially arcuate, axially curved portion 115 may be defined by one or more arcuate, curvilinear ridges 149 (integral or attached) that extend axially from the face guard 138, away from the back face BF, or, alternately, the curved portion 115 may be defined by a curvilinear portion of the face guard 138 itself, such as a recessed groove therein, or a combination of the two. For example, in the depicted embodiment, the radially-outer side of the second groove 111 is defined by a concave inner face of the integrally-attached ridge 149 to form half of the groove 111, and the radially-inner border of the second groove 111 is defined by a curved segment 117 of the face guard 138 itself, spaced away from the sleeve 122 by the width of a rim 121 in the face guard 138.

Suitable materials for the pulley body 116 include aluminum, plastics, and other appropriate non-magnetic materials, or a combination thereof, including composite materials. The belt engaging portion 136 is an outer annular surface that is radially outward relative to the central axis of rotation A of the damper-isolator 100 and includes an outer belt engaging surface, which may be flat, contoured to receive a rounded belt, or have V-grooves for mating with the V-ribs of a V-ribbed belt, or have any other required contoured groove to mate with an endless belt.

Referring now to FIG. 3, when damper-isolator 100 is assembled, the radially arcuate, axially curved portions 113, 115 of the hub 102 and the pulley body 116 are aligned and mated together to define first and second portions of a magnet track 109 concentric about the hub. In one embodiment, the radially arcuate, axially curved portions 113, 115 each form complete rings radially concentric about the hub 102, and the magnet track 109 thus defines an enclosed, generally toroidal cavity. In an alternate embodiment, the magnet track 109 does not form a complete ring, but rather an arcuate, tubular segment.

One or more hub magnets 123 and one or more pulley magnets 125 are positioned within the magnet track 109. The magnets 123, 125 may be rare earth magnets, and more particularly, may be neodymium magnets. The hub magnets 123 are affixed to the curved portion 113 of the hub-side portion of the magnet track 109, and the pulley magnets 125 are affixed to the pulley-side portion of the magnet track 109. A clearance gap 137 is maintained between the pulley magnets 125 and the curved portion 113 on the hub-side portion of the magnet track 109, and a clearance gap 141 is maintained between the hub magnets 123 and the curved portion 115 of the pulley-side portion of the magnet track 109.

Referring additionally to FIGS. 5 and 6, in one embodiment, the curved portion 113 of the hub 102 has bores 133 formed therein, and the curved portion 115 of the pulley body 116 has bores 135 formed therein. Grub screws 131 that are formed of or which include a ferromagnetic material, such as steel, are received in bores 133, 135 to retain the magnets 123, 125 in their respective fixed positions in the magnet track by magnetic attraction. Alternately, mechanical fasteners may be used to mechanically secure the magnets 123, 125 to the appropriate curved portions 113, 115.

Both of the radially arcuate, axially curved portions 113, 115 of the hub 102 and pulley body 116 may further include seats or pockets 127 to receive and properly position the magnets 123, 125 to prevent them from freely moving within the tubular passage of the magnet track 109 and/or to prevent them from maneuvering to change polar orientation. In one embodiment, each pocket 127 is defined by a pair of partitions 129 (one positioned on either side of the respective magnet 123, 125) that extend axially from the interior of the curved portions 113, 115 to at least partially transect the magnet track 109.

Accordingly, the magnets 123, 125 do not move freely within the magnet track 109. Rather, the hub magnets 123 are connected to the hub 102 for rotation therewith, and the pulley magnets 125 are connected to the pulley body 116 for rotation therewith. When the hub 102 rotates relative to the pulley body 116, the hub magnets 123 move only within the second groove 111 portion of the magnet track 109, relative to the curved portion 115, and do not move relative to the curved portion 113. Similarly, the pulley magnets 125 move only within the first groove 107 portion of the magnet track 109, relative to the curved portion 113, and do not move relative to the curved portion 115. The clearance gaps 137, 141 ensure that each magnet 123, 125 does not frictionally engage the curved portion 113, 115 opposite to the curved portion 113, 115 to which that magnet is connected. Thus, no lubricant is needed within the magnet track 109, because there is no physical contact between the components on opposite sides of the magnet track 109.

Figure 4:
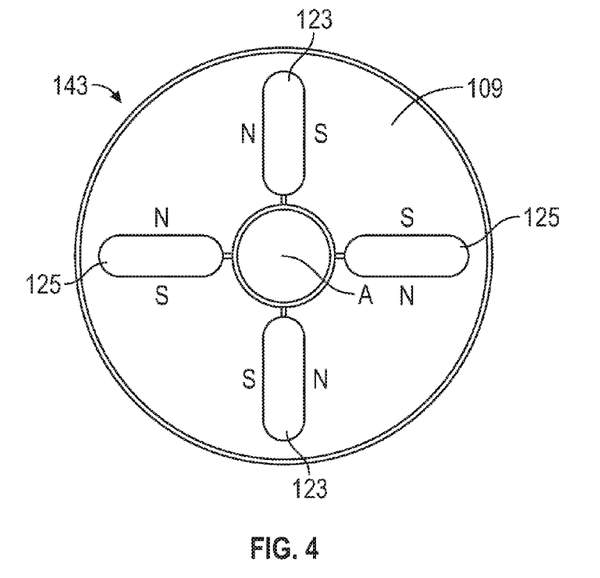
FIG. 4 is a top schematic view indicating the relative polarities of the magnets of the spring isolator system of the torsional vibration damper of FIG. 2.

Referring now to FIGS. 3 and 4, in one embodiment, the damper-isolator 100 includes four total magnets (two hub magnets 123 and two pulley magnets 125) evenly positioned 90 degrees apart from each other. The two hub magnets 123 are positioned 180 degrees apart from each other, and the two pulley magnets 125 are positioned 180 degrees apart from each other. Thus, the hub magnets 123 and the pulley magnets 125 are evenly spaced in an alternating pattern within the magnet track 109. The magnets 123, 125 are oriented such that each face of each magnet 123, 125 has the same polarity as the polarity (north or south) as the face of neighboring magnets 123, 125 (see, e.g., FIG. 4). Only the relative polarity (same vs. different), not the actual polarity (north vs. south) is relevant in this regard. One of ordinary skill will appreciate that other arrangements of magnets 123, 125 are possible, in terms of the number and strength of the magnets used, the spacing of the magnets, and the polar orientations of the magnets, to allow different angular motions and spring functionality between the hub 102 and the pulley body 116, as desired for the particular application. For example, in one alternate embodiment, the damper-isolator includes three hub magnets 123 positioned 120 degrees apart from each other and three pulley magnets 125 positioned 120 degrees apart from each other, where each hub magnet 123 is spaced 60 degrees apart from each of two neighboring pulley magnets 125.

In another embodiment, the damper-isolator includes only one hub magnet 123 and/or one pulley magnet 125 (i.e., two or three magnets, total). For example, with reference to FIG. 4, one of the hub magnets 123 could be omitted and two pulley magnets 125 could be retained. Or, one each of the hub magnets 123 and pulley magnets 125 could be omitted (for example, to facilitate spacing of the magnets to facilitate rotation greater than about 90 degrees). In such embodiments, and also in embodiments incorporating uneven numbers of hub and pulley magnets 123, 125, additional structural barriers (not shown) similar to the partitions 129 may be included within the magnet track 109 to further restrict undesired rotation and/or to ensure proper positioning between the hub 102 and the pulley body 116 in a relaxed state. The magnet track 109 may have an arcuate length that is limited to the minimum required to facilitate the desired rotation parameters.

Accordingly, the magnets 123, 125 and the magnet track 109 define an isolator assembly 143 of the damper-isolator 100. When the hub 102 and pulley body 116 rotate relative to each other, neighboring magnets approach each other and generate a progressively stronger (non-linear) repulsive force as the magnets get closer and closer together. Thus, the magnets 123, 125 serve as a magnetic spring to counter angular motion between the hub 102 and the pulley body 116, thereby cushioning the rotation of hub 102 and pulley body 116 relative to each other in a manner analogous to a conventional mechanical or elastomeric spring, but without many of the drawbacks associated with these traditional isolator designs. If the torsional forces acting upon the magnets 123, 125 are strong enough to overcome the magnetic force of repulsion between neighboring magnets 123, 125, the partitions 129 of the magnet seats 127 serve as mechanical safeties to prevent over-rotation of the hub 102 relative to the pulley body 116 past a predetermined maximum amount of rotation (in the depicted embodiment, about 90 degrees).

Referring again to FIGS. 2 and 3, the first slide bearing 114 and the second slide bearing 124 are positioned on either side of the magnet track (radially) to define a bearing system that facilitates smooth, angular movement between the hub 102 and the pulley body 116. This bearing system also serves as a seal for the magnet track 109 to prevent contamination and debris from entering the magnet track 109 and interfering with the smooth operation of the isolator assembly 143. The first slide bearing 114 is positioned within the annular receptacle 108 of the hub 102, between a radially-outer edge 145 of the arcuate ridge 149 of the pulley body 116 and the inner radial surface 154 of the second flange 152 of the hub 102. The first slide bearing 114 may be a cylindrical steel ring that is press-fit between the hub 102 and the pulley body 116. The first slide bearing 114 may be formed of a non-magnetic metal, alloy, or other material, or a composite such as a nylon composite.

The second slide bearing 124 is positioned within the annular receptacle 108 of the hub 102, between the sleeve 122 of the pulley body 116 and the outer radial surface 150 of the first flange 101 of the hub 102. The second slide bearing 124 may be a cylindrical steel ring that is press-fit between the hub 102 and the pulley body 116, and it may include a radially-outward extending flange 146 that receives a bottom edge 148 of the sleeve 122 to provide enhanced sealing functionality. The second slide bearing 124 may alternately be formed of a non-magnetic metal, alloy, or other material, or a composite such as a nylon composite.

The damper-isolator 100 includes the elastomeric damper member 120 disposed between the outermost radial surface 106 of the second flange 152 of the hub 102 and the inertia member 118. The inertia member 118 is seated against the elastomeric damper member 120, thereby operably coupling the inertia member 118 to the hub 102 for rotation therewith. The inertia member 118 may be made from any material having a sufficient inertia, usually cast iron, steel, or similar dense material. As illustrated in FIG. 3, the inertia member 118 is concentric with and spaced radially outward from the hub 102 such that the outermost radial surface 106 of the second flange 152 of the hub 102 faces an inner surface 119 of the inertia member 118 and defines a gap therebetween. The elastomeric damper member 120 may be press-fit or injected into this gap so as to non-rigidly couple the hub 102 and the inertia member 118.

The elastomeric damper member 120 may be any suitable elastomer to absorb and/or dampen the torsional vibrations generated by a rotating shaft upon which the damper-isolator 100 is mounted. The elastomeric members may have a generally low tensile modulus and high yield strain. The elastomer is preferably one suitable for automotive engine applications, i.e., suitable to withstand temperatures experienced in the engine and road temperatures and conditions. The elastomeric damper member 120 may, however, be as disclosed in U.S. Pat. No. 7,658,127, which is incorporated herein, in its entirety, by reference. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber. In one embodiment, the elastomeric damper member 120 may be attached to the outermost radial surface 106 using a conventional adhesive known for use in vibration damping systems. Some examples of suitable adhesives include rubber bonding adhesives sold by the Lord Corporation, Henkel AG & Co., or Morton International Incorporated Adhesives & Specialty Company.

Once assembled, as shown in FIG. 3, the elastomeric damper member 120 and the inertia member 118 are disposed between the outermost radial surface 106 of the second flange 152 of the hub 102 and the belt engaging portion 136 of the pulley body 116. The isolator assembly 143 is disposed radially inward of the elastomeric damper member 120, where the radially arcuate, axially curved portion 113 of the hub 102 and the radially arcuate, axially curved portion 115 of the pulley body 116 define the portions of the magnet track 109 that receives the magnets 123, 125, and where the slide bearings 114, 124 are positioned within the annular receptacle 108 of the hub 102 to facilitate rotation of the hub 102 relative to the pulley body 116. The belt engaging portion 136 is radially-concentric about the hub 102, and the central bore 147 of the pulley body 116 is seated about the inner radial surface 104 of the first flange 101 of the hub 102, more particularly, is seated about the second slide bearing 124 press-fit to the inner radial surface 104 of the hub 102.

The damper-isolator disclosed herein provides an isolator system with a large free angle for startup and shutdown of the engine, while providing a magnetic spring that gets progressively stiffer as the FEAD torque comes into action due to the repulsive force generated from the proximity of magnets within the magnet track oriented with like polarity facing one another. When the hub magnets 123 approach the pulley magnets 125, there is a repulsive force that increases proportionately (non-linearly) and is inversely related to the relative angular distance between the magnets 123, 125. Accordingly, the isolator assembly of the disclosed damper-isolator provides a large free angle like a mechanical spring, but with less noise, a lighter construction, and less expensive material costs. The disclosed isolator assembly also provides a non-linear spring rate like an elastomeric spring, but with much better fatigue life and much better temperature vs. frequency characteristics than an isolator with an elastomeric spring. The disclosed damper-isolator may also be smaller in construction than either mechanical or elastomeric spring based designs because it can be packaged more tightly.

Although the invention is shown and described with respect to certain embodiments, it is obvious that modifications will occur to those skilled in the art upon reading and understanding the specification, and the present invention includes all such modifications.

What is claimed is:

1. A damper-isolator comprising:
a hub defining a bore therethrough for receiving a shaft;
a pulley body mated to the hub to collectively define a magnet track that is concentric about the bore of the hub;
a damper assembly operatively disposed between the hub and a belt engaging portion of the pulley body;

a first magnet positioned within the magnet track and connected to the hub for rotation therewith; and a second magnet positioned within the magnet track and connected to the pulley body for rotation therewith;

wherein the first magnet and the second magnet are positioned with like polarities facing one another;

wherein the hub further comprises a first pocket in which the first magnet is seated and the pulley body further comprises a second pocket in which the second magnet is seated, and the first pocket is defined by a pair of first partitions within the magnet track and the second pocket is defined by a pair of second partitions within the magnet track.

2. The damper-isolator of claim 1, wherein the damper assembly comprises:

an elastomeric damper member radially outward and concentric about the hub; and an inertia member seated against the elastomeric damper member thereby operably coupling the inertia member to the hub for rotation therewith.

3. The damper-isolator of claim 1, comprising a plurality of first magnets and a plurality of second magnets, wherein the plurality of first magnets are positioned in an alternating fashion relative to the plurality of second magnets within the magnet track.

4. The damper-isolator of claim 1, wherein the first magnet is evenly spaced apart from the second magnet within the magnet track.

5. The damper-isolator of claim 1, wherein the first magnet is connected to the hub by a first fastener, and the second magnet is connected to the pulley body by a second fastener.

6. The damper-isolator of claim 5, wherein at least one of the first fastener and the second fastener comprises a ferromagnetic material.

7. The damper-isolator of claim 1, further comprising a slide bearing disposed between mating radially facing surfaces of the hub and the pulley body that are rotatable relative to one another.

8. The damper-isolator of claim 1, wherein the hub and the pulley body, collectively, define a first clearance gap between the first magnet and the pulley body and a second clearance gap between the second magnet and the hub along the respective line of travel of each within the magnet track.

9. The damper-isolator of claim 1, wherein the hub and the pulley body are each formed of a non-ferromagnetic material.

10. A damper-isolator comprising:

a hub defining a bore therethrough for receiving a shaft;

a first slide bearing and a second slide bearing positioned against opposing radially facing surfaces of the hub;

a pulley body mated to the hub in operative rotational engagement relative thereto against the first and the second slide bearings, wherein the pulley body and the hub collectively define a magnet track that is sealingly enclosed and concentric about the bore of the hub;

a damper assembly operatively disposed between the hub and a belt engaging portion of the pulley body; and an isolator assembly comprising:

a first magnet positioned within the magnet track and connected to the hub for rotation therewith; and a second magnet positioned within the magnet track and connected to the pulley body for rotation therewith;

wherein the first magnet and the second magnet are positioned with like polarities facing one another.

11. A front end accessory drive system comprising:

a damper-isolator of claim 10 mounted to a crankshaft for rotation therewith.

12. The front end accessory drive system of claim 11, wherein the damper-isolator comprises a plurality of first magnets and a plurality of second magnets, wherein the plurality of first magnets are positioned in an alternating fashion relative to the plurality of second magnets within the magnet track.

13. The front end accessory drive system of claim 11, wherein the first magnet is connected to the hub by a first fastener, and the second magnet is connected to the pulley body by a second fastener.

14. The front end accessory drive system of claim 11, wherein the damper-isolator further comprises a slide bearing disposed between mating radially facing surfaces of the hub and the pulley body that are rotatable relative to one another.

15. The front end accessory drive system of claim 11, wherein the hub and the pulley body, collectively, define a first clearance gap between the first magnet and the pulley body and a second clearance gap between the second magnet and the hub along the respective line of travel of each within the magnet track.

16. The damper-isolator of claim 10, wherein the damper assembly comprises:

an elastomeric damper member radially outward and concentric about the hub; and an inertia member seated against the elastomeric damper member thereby operably coupling the inertia member to the hub for rotation therewith.

17. The damper-isolator of claim 10, wherein the first magnet is evenly spaced apart from the second magnet within the magnet track.

18. The damper-isolator of claim 10, wherein the hub and the pulley body, collectively, define a first clearance gap between the first magnet and the pulley body and a second clearance gap between the second magnet and the hub along the respective line of travel of each within the magnet track.

* * * * *